United States Patent [19]
Massaro et al.

[11] Patent Number: 5,535,321
[45] Date of Patent: Jul. 9, 1996

[54] METHOD AND APPARATUS FOR VARIABLE COMPLEXITY USER INTERFACE IN A DATA PROCESSING SYSTEM

[75] Inventors: Timothy J. Massaro; Dennis J. Schmidt, both of Rochester, Minn.

[73] Assignee: International Business Machines Corporation, Armonk, N.Y.

[21] Appl. No.: 655,870

[22] Filed: Feb. 14, 1991

[51] Int. Cl.⁶ .................................................. G06T 1/00
[52] U.S. Cl. .................................................. 395/155
[58] Field of Search .......................... 395/153, 155, 395/161, 156; 273/433, 434

[56] References Cited

U.S. PATENT DOCUMENTS

| | | | |
|---|---|---|---|
| 4,805,134 | 2/1989 | Calo et al. | 364/900 |
| 4,817,018 | 3/1989 | Cree et al. | 364/518 |
| 4,821,211 | 4/1989 | Torres | 364/521 |
| 4,964,077 | 10/1990 | Elsen et al. | 364/900 |
| 5,008,853 | 4/1991 | Bly et al. | 364/900 |
| 5,115,501 | 5/1992 | Kerr | 395/600 |

FOREIGN PATENT DOCUMENTS

0367709A1  5/1990  European Pat. Off. ........ G09F 9/44

OTHER PUBLICATIONS

Patent Abstracts of Japan vol. 10 No. 310, Oct. 1986, Izumida Yoshio et al. "Intelligence Editing Method" Pub. No. JP61123947.

Patent Abstracts of Japan vol. 15 No. 210, May 1991, Hyodo Takeshi "Computer Input System" Pub. No. JP3058116.

*Primary Examiner*—Almis R. Jankus
*Assistant Examiner*—Joseph R. Feild
*Attorney, Agent, or Firm*—Andrew J. Dillon

[57] ABSTRACT

A method and apparatus for enhanced user interface in a data processing system for use with a multiple function application. Multiple user interfaces are established for selected functions within a multiple function application and stored within a data processing system. Each of the multiple user interfaces preferably has a different level of complexity. User profiles for selected users within the data processing system are then utilized to specify desired levels of complexity for particular functions for each selected user. Thereafter, these user profiles are utilized to automatically select a particular one of the multiple user interfaces within a multiple function application in response to a selection of a particular function by a user. In one depicted embodiment of the present invention a user may selectively alter a user profile or alternatively, the user profile may be automatically altered by the occurrence of a selected event, such as the lapse of a selected period of time or the completion of an education course by a user. In either event a default user interface is also provided for utilization in situations wherein a user profile does not specify a desired level of complexity for a selected function.

7 Claims, 3 Drawing Sheets

| System default: *BASIC  /38 |||||
|---|---|---|---|---|
| User profile assistance level default: *SYSTEM  /36, /34 |||||
| 32— | Function | Assistance Level | | |
| . . . | Spreadsheet | *DEFAULT | . . . | |
| . . . | Reports/Printer output | *DEFAULT | . . . | |
| . . . | Data Entry | *ADVANCED | . . . | |
| . . . | File manipulation | *BASIC | . . . | |
| . . . | . . . | *DEFAULT | . . . | |
| . . . | . . . | *DEFAULT | . . . | |

⌐14

METHOD AND APPARATUS FOR VARIABLE COMPLEXITY USER INTERFACE IN A DATA PROCESSING SYSTEM

BACKGROUND OF THE INVENTION

1. Technical Field

The present invention relates in general to an improved data processing system and in particular to an enhanced user interface for utilization with a data processing system. Still more particularly, the present invention relates to an enhanced user interface which permits the automatic selection of variable complexity user interfaces for selected functions within a multiple function application.

2. Description of the Related Art

The design of modern state-of-the-art computer systems devotes much effort to enhancing the efficiency of the interface between man and machine. So-called "user interfaces" must be sufficiently simple or intuitive to permit relatively unskilled users to utilize complex software applications, yet these user interfaces must be complete enough to allow skilled users to access the multitude of features which modern applications typically provide. Often a designer must simply compromise and provide an interface which represents a less than optimal solution to both of these problems.

One example of a known solution to this problem is exhibited in many game or entertainment applications in which a user may select a "beginner," "intermediate," or "expert" level of play wherein the speed, complexity and skill level of a selected game may be permanently altered for the duration of an entire game or sequence. While this approach permits users of varying skill levels to enjoy a single game it does not recognize that a user may have differing skill levels for different aspects of a game or entertainment application. No provision exists in such systems for accommodating a user having expert level skill in one aspect and beginner level skill in another aspect of the game or entertainment application.

A similar approach which may be utilized in conjunction with productivity software, such as word processing, is disclosed in U.S. Pat. No. 4,821,211, issued to Robert J. Torres and assigned to the assignee herein. This patent allows a user designated as an "expert" to omit unnecessary intermediate steps for all functions within the application. For example, menu solutions may not be displayed for users who are expected to recall all available functions at selected locations within the application. As above, the method disclosed in U.S. Pat. No. 4,821,211 contains no provision for accommodating a user having varying levels of skills for different functions within a multiple function application.

It should therefore be apparent that a need exists for a method and apparatus which allows variable complexity user interfaces to be established for different functions within a multiple function application.

SUMMARY OF THE INVENTION

It is therefore one object of the present invention to provide an improved data processing system.

It is another object of the present invention to provide an enhanced user interface for utilization with a data processing system.

It is yet another object of the present invention to provide an enhanced user interface which permits the automatic selection of variable complexity user interfaces for selected functions within a multiple function application.

The foregoing objects are achieved as is now described. The method and apparatus of the present invention utilizes multiple user interfaces which are established for selected functions within a multiple function application and stored within a data processing system. Each of the multiple user interfaces preferably has a different level of complexity. User profiles for selected users within the data processing system are then utilized to specify desired levels of complexity for particular functions for each selected user. Thereafter, these user profiles are utilized to select a particular one of the multiple user interfaces within a multiple function application in response to a selection of a particular function by a user. In one depicted embodiment of the present invention a user may selectively alter a user profile or alternatively, the user profile may be automatically altered by the occurrence of a selected event, such as the lapse of a selected period of time or the completion of an educational course by a user. In either event a default user interface is also provided for utilization in situations wherein a user profile does not specify a desired level of complexity for a selected function.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figures 1, 2:
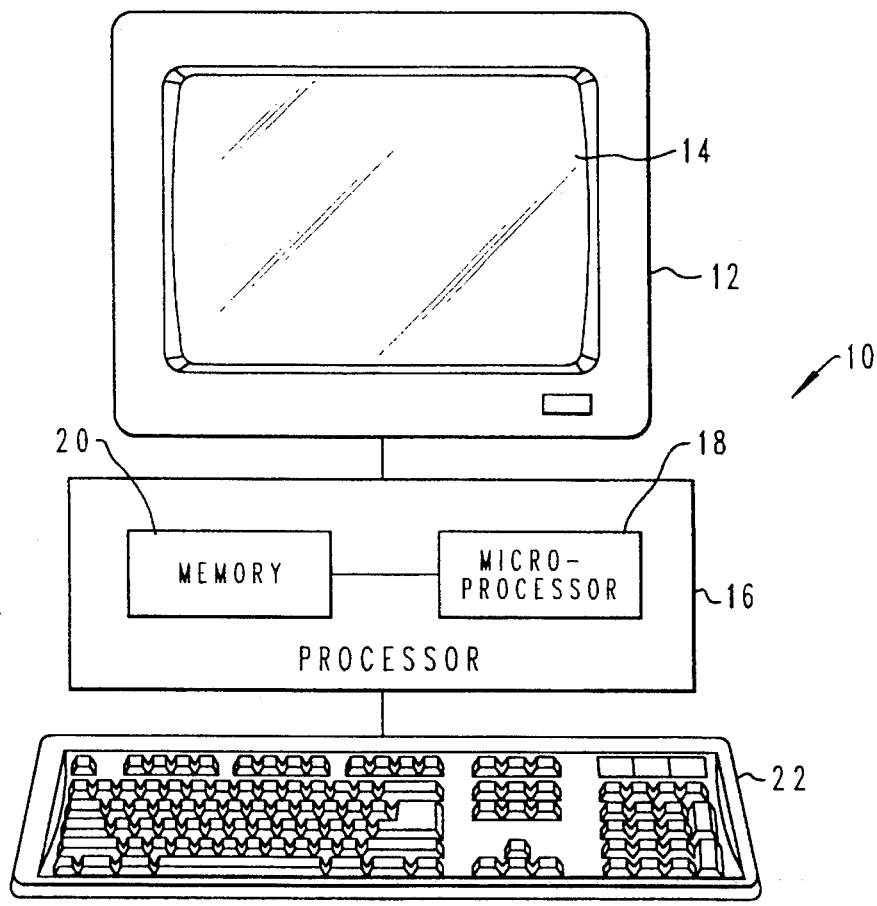
FIG. 1 is a pictorial representation of a data processing system which may be utilized to implement the method and apparatus of the present invention.
FIG. 2 is a pictorial representation of a computer display depicting a user profile which may be utilized to implement the method and apparatus of the present invention.

With reference now to the figures and in particular with reference to FIG. 1, there is depicted a pictorial representation of a data processing system 10 which may be utilized to implement the method and apparatus of the present invention. As illustrated, data processing system 10 includes a display device 12 which is utilized to create a video output on display screen 14. Display device 12 is preferably coupled to processor 16 which, as those skilled in the art of computer devices will appreciate, preferably includes a microprocessor 18 and memory storage 20. Coupled to processor 16 is keyboard 22 which is utilized, in accordance with the illustrated embodiment of the present invention, to permit a user to selectively alter a user profile in a manner which will be explained in greater detail herein.

Upon reference to the specification contained herein, those skilled in the art will appreciate that data processing system 10 may be implemented utilizing a so-called "personal" computer such as the PS/2 Personal Computer manufactured by International Business Machines Corporation of Armonk, N.Y. Alternatively, data processing system 10 may be implemented utilizing a larger computer such as the mid-range Model AS/400 computer manufactured by International Business Machines Corporation or any of a number of suitable large mainframe computers. The method and apparatus of the present invention may be utilized to implement an enhanced user interface in conjunction with any data processing system having a multiple function application resident therein.

Referring now to FIG. 2, there is depicted a pictorial representation of a computer display screen 14 depicting a user profile which may be utilized to implement the method and apparatus of the present invention. As is illustrated, the user profile includes a list of functions under function column 32 and an assistance level for each function under assistance level column 34. In this manner, a user may identify a particular function within a multiple function application and specify a level of complexity or assistance level which that user desires with respect to that particular function.

Further, as illustrated in FIG. 2, the user may specify a user profile assistance level default at entry point 36 and a system default at entry point 38. In this manner, in the event that a user profile does not specify a desired level of complexity or assistance level for a particular function, the method of the present invention first attempts to determine whether or not the user profile specifies a default level for that user.

For example, a user may specify a default level of intermediate complexity for all functions not explicitly set forth within the user profile. In this manner the user is not required to physically enter a desired level of complexity for a large number of the functions specified. Further, the entire system may have a default level such as "BASIC" which will be utilized in the event no user profile or user profile assistance level default exists for a particular user or for a particular function. Further, as illustrated in the user profile depicted within computer display screen 14, a user may specify that the system level default is to be utilized in the event the user profile does not specify a desired level of complexity for a particular function.

Figures 3, 4, 5:
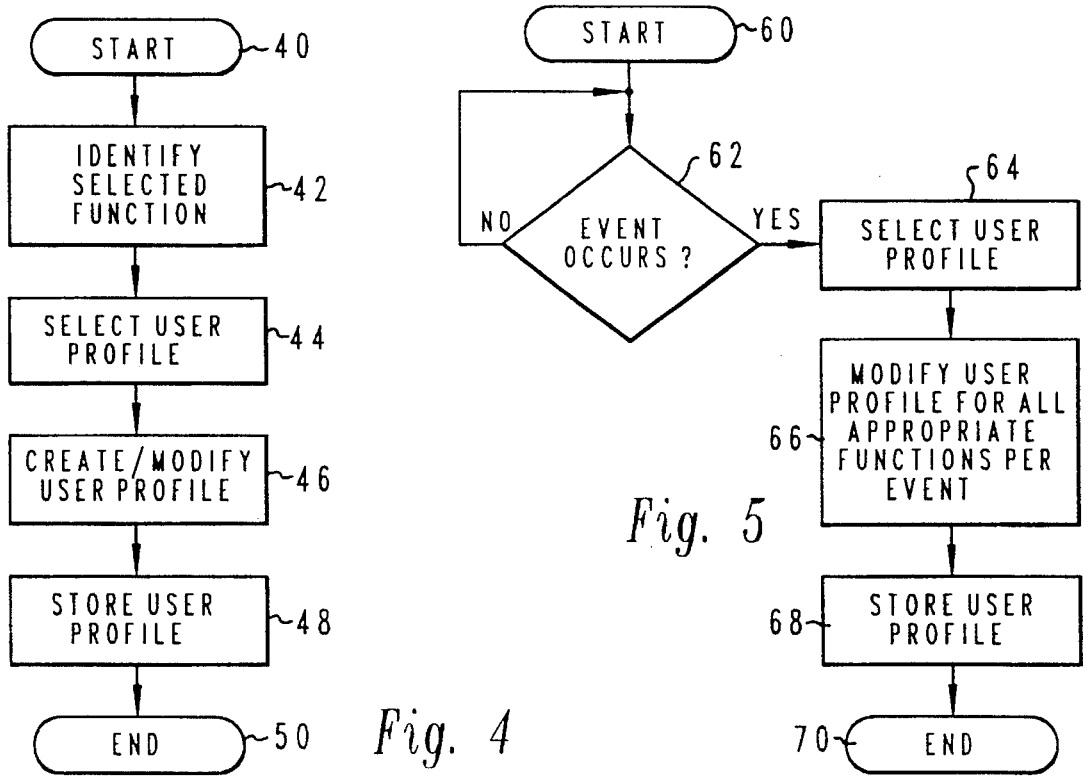
FIG. 3 is a pictorial representation of a computer display depicting the modification of a portion of a user profile which may be utilized to implement the method and apparatus of the present invention.
FIG. 4 is a logic flow chart illustrating the creation/modification of a user profile which may be utilized to implement the method and apparatus of the present invention.
FIG. 5 is a logic flow chart illustrating the automatic modification of a user profile which may be utilized to implement the method and apparatus of the present invention.

Referring now to FIG. 3, there is depicted a pictorial representation of a computer display screen depicting the modification of a user profile which may be utilized to implement the method and apparatus of the present invention. As illustrated, computer display screen 14 may be utilized to depict a user profile associated with a particular function of a multiple function computer application. Function identifier 24 is preferably utilized in conjunction with the user profile depicted within display screen 14 to identify the particular function for which a desired level of complexity is specified.

Also depicted within computer display screen 14 is assistance level window 26. Assistance level window 26 is utilized, in accordance with the method and apparatus of the present invention, to permit a user to identify the current level of assistance, or complexity specified for the function identified within function identifier 24. As illustrated within current level identifier 28, the "basic" level interface has been selected for the function identified by function identifier 24. Also depicted within assistance level window 26 is selected level identifier 30, which permits a user to type in, via keyboard 22 (see FIG. 1), a desired level of complexity for the function identified within function identifier 24.

As illustrated, a user may select a basic level of complexity, an intermediate level of complexity or an advanced level of complexity for the function identified in function identifier 24. Thus, upon reference to the foregoing those skilled in the art will appreciate that the user profile depicted within FIG. 2 may be utilized by a user to specify a desired level of complexity for each of a plurality of functions within a complex computer application having multiple functions associated therewith. In this manner, a user having a great deal of expertise with regard to one function may select the most complex level of interface for that function while specifying a less complex level of interface for those functions for which the user has less expertise.

With reference now to FIG. 4, there is depicted a logic flow chart which illustrates the creation/modification of a user profile such as the user profile depicted within FIG. 3. As illustrated, the process begins at block 40 and thereafter passes to block 42 which depicts the identification of a selected function from a multiple function software application. Next, the process passes to block 44 which illustrates the selection of the user profile for the user in question with respect to the identified function.

After selecting a user profile for the user in question and identifying the selected function from those functions contained within the multiple function application, block 46 next illustrates the creation/modification of the user profile. As illustrated in FIG. 3, this step permits the user to specify or modify the level of assistance requested for a particular function. That is, the level of complexity to be utilized in the interface between the user and the selected function. Next, the process passes to block 48 which illustrates the storing of the user profile within data processing system 10 (see FIG. 1) and the process thereafter terminates, as illustrated in block 50.

Referring now to FIG. 5, there is depicted a logic flow chart which illustrates the automatic modification of a user profile in a manner which may be utilized to implement the method and apparatus of the present invention. As above, the process begins at block 60 and thereafter passes to block 62 which illustrates a determination of whether or not a selected event has occurred. Those skilled in the art will appreciate that by "selected event" what is meant is any event which may be characterized by the user and utilized to automatically modify a user profile such that the level of complexity of a user interface selected for a particular function may be modified.

For example, a system may be implemented which permits the user interface selected by a particular user for a selected function within a multiple function application to increase in complexity following the lapse of a selected period of time. That is, after the user has utilized the application for a selected period of time the complexity of the interface between the user and a selected function within the application may be automatically increased in complexity in recognition of the increased amount of experience which the user has accumulated with regard to that function. Additionally, the entry of an indication of educational accomplishment with regard to a particular function in the personnel file of a particular user may also, in accordance with the spirit and intent of the present application, be utilized to automatically modify the level of complexity of an interface selected by a user for a particular function.

In either case, block 62 illustrates a determination of whether or not an event has occurred which may be utilized to initiate the modification of a user profile in accordance with the method and apparatus of the present invention. Until such time as an event does occur, the process merely iterates, as illustrated at block 62. However, after an event has occurred which has been designated by a user or the system operator as an event which precipitates the automatic modification of a user profile, the process then passes to block 64 which illustrates the selecting of the user profile for the function and user in question. Thereafter, block 66 illustrates the modification of the user profile in the manner specified in association with the event which has occurred. Finally, the modified profile is then stored within data processing system 10 (see FIG. 1) as depicted in block 68 and the process again terminates, as illustrated in block 70.

Figure 6:
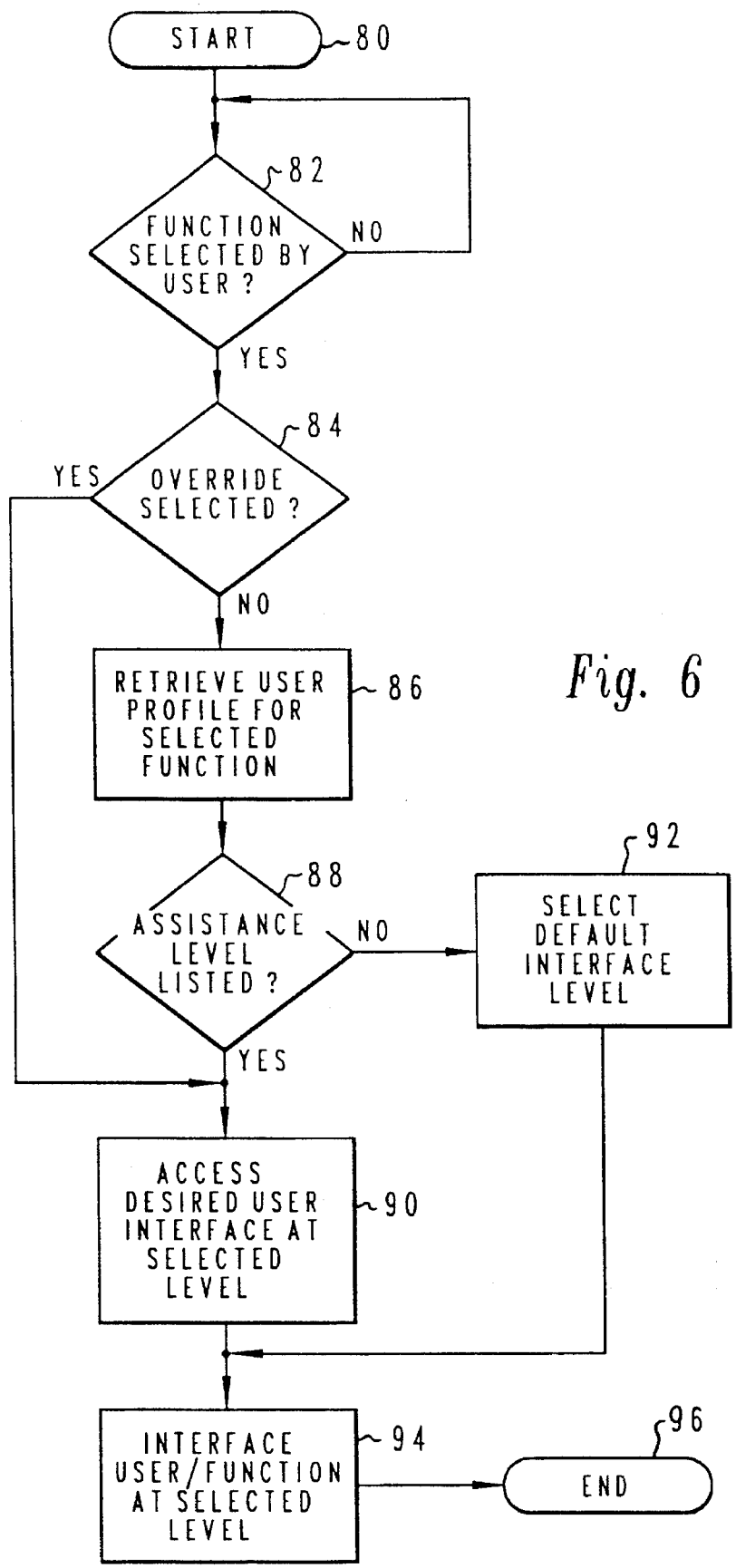
FIG. 6 is a logic flow chart illustrating the establishment of a variable complexity user interface in accordance with the method and apparatus of the present invention.

Finally, with reference to FIG. 6, there is depicted a logic flow chart which illustrates the establishment of a variable complexity user interface in accordance with the method and apparatus of the present invention. As above, the process begins at block 80 and thereafter passes to block 82 which depicts a determination of whether or not a function within the multiple function application has been selected by a user. If not, the process merely iterates until such time as a particular function has been selected by the user. After a function has been selected, the process passes to block 84.

Block 84 illustrates a determination of whether of not an override has been selected by the user. By "override" what is meant is whether or not the user has explicitly selected a particular level of complexity for a desired user interface. By providing an override capability the method and apparatus of the present invention permit a user to temporarily specify a different level of complexity for a user interface than the level which is specified within his or her user profile. By utilizing the override approach a user may be permitted to temporarily view a different user interface having a differing level of complexity without explicitly changing the desired level of complexity for that function within his or her user profile.

If the override function has been selected, as determined in block 84, the process passes to block 90 which illustrates the accessing of the desired user interface at the selected level. Thereafter, the selected interface is utilized to couple that user to that function within the multiple function application, as illustrated in block 94. The process then terminates, as depicted in block 96. Of course, those skilled in the art will appreciate that an override function may be selected at any point during the process without departing from the spirit and intent of the present invention. Referring again to block 84, in the event the override function has not been selected, the process then passes to block 86. Block 86 illustrates the retrieval of the user profile for the user in question and for the selected function.

After retrieving the user profile for the selected function, as illustrated in block 86, the process passes to block 88 which depicts the determination of whether or not the assistance level for the function in question is listed within the user profile. That is, the level of complexity which the user in question desires for an interface with that function. In the event the assistance level is listed, as determined within block 88, the process passes to block 90 which illustrates the retrieval of the desired user interface at the selected level of assistance.

In accordance with an important feature of the present invention, in the event an assistance level is not listed within the retrieved user profile, as determined in block 88, then the process passes to block 92 which illustrates the selection of a default interface level. Those skilled in the art will appreciate that in situations wherein multiple user interfaces are available for utilization by a user with regard to a selected function a default interface should be available for those instances in which the user profile does not specify a particular level of assistance for that function. Generally, the default interface level will be the most basic level of interface available for that function. That is, in the depicted embodiment of the present invention, the level of interface having the least number of options presented to the user when utilizing the function in question. Of course, the intermediate and expert levels of interface will, in accordance with the method of the present invention, present increased numbers of options to the user for dealing with the selected function. Thus, an expert level of interface selected by a user for a particular function will present to that user a maximum number of options for activities with regard to the selected function. Further, an expert level of interface may only present options without additional textual information in order to allow space for additional list entries in a highly complex interface.

After selecting a default level of interface in accordance with a predetermined default setting, the process then passes from block 92 to block 94, which illustrates the interfacing of the user and function at the selected level of assistance. That is, either the default interface level or the interface level which is determined in accordance with the user profile. Thereafter, the process again terminates, as depicted in block 96.

Upon reference to the foregoing, those skilled in the art will appreciate that the Applicants herein have created a variable complexity user interface system wherein the level of complexity of a user interface between the user and an application may be varied in response to the function selected and to a level either determined by the user or automatically modified by the system. In this manner, a user utilizing a complex software application, such as an integrated accounting package, may specify an expert level of skill with regard to data entry or data manipulation while requiring a basic level of assistance for the interface with regard to file origination or manipulation, functions which are rarely utilized by selected individuals.

While the invention has been particularly shown and described with reference to a preferred embodiment, it will be understood by those skilled in the art that various changes in form and detail may be made therein without departing from the spirit and scope of the invention.

We claim:

1. A method in a data processing system for an enhanced user interface for use with a multiple function application, said method comprising the steps of:

establishing multiple user interfaces for each of a plurality of functions within said multiple function application, each of said multiple user interfaces having a differing level of complexity;

creating a user profile for at least one user within said data processing system, said user profile specifying a different desired level of complexity for said at least one user with respect to each of at least two of said plurality of functions within said multiple function application;

selectively altering said user profile in response to an occurrence of a selected event;

determining if said user profile specifies a level of complexity for a particular function within said multiple function application in response to a selection of said particular function by said at least one user;

utilizing said user profile to automatically select a particular one of said multiple user interfaces for said particular function if said user profile specifies a level of complexity for said particular function within said multiple function application; and automatically selecting a default user interface from said multiple user interfaces in response to a failure of said user profile to specify a level of complexity for said particular function within said multiple function application.

2. The method in a data processing system for an enhanced user interface for use with a multiple function application according to claim 1, further including the step of storing said user profile within said data processing system.

3. The method in a data processing system for an enhanced user interface for use with a multiple function application according to claim 1, wherein said multiple user interfaces include at least one basic user interface having a minimum number of options associated therewith for activities with respect to a selected function.

4. The method in a data processing system for an enhanced user interface for use with a multiple function application according to claim 1, wherein said multiple user interfaces include at least one advanced user interface having a maximum number of options associated therewith for activities with respect to a selected function.

5. A data processing system having an enhanced user interface for use with a multiple function application, said data processing system comprising:

memory means;

multiple user interfaces stored within said memory means for each of a plurality of functions within said multiple function application, each of said multiple user interfaces having a differing level of complexity;

a user profile stored within said memory means for at least one user within said data processing system, said user profiles specifying a different desired level of complexity for said at least one user with respect to each of at least two of said plurality of functions within said multiple function application;

means for selectively altering said user profile in response to an occurrence of a selected event;

means for determining if said user profile specifies a level of complexity for a particular function within said multiple function application in response to a selection of said particular function by said at least one user;

control means for accessing and utilizing said user profile to automatically select a particular one of said multiple user interfaces for said particular function if said user profile specifies a level of complexity for said particular function within said multiple function application; and means for automatically selecting a default user interface from said multiple user interfaces in response to a failure of said user profile to specify a level of complexity for said particular function within said multiple function application.

6. The data processing system having an enhanced user interface for use with a multiple function application according to claim 5, wherein said multiple user interfaces include at least one basic user interface having a minimum number of options associated therewith for activities with respect to a selected function.

7. The data processing system having an enhanced user interface for use with a multiple function application according to claim 6, wherein said multiple user interfaces include at least one advance user interface having a maximum number of options associated therewith for activities with respect to a selection function.

* * * * *